US 8,548,903 B2

(12) United States Patent
Becker

(10) Patent No.: US 8,548,903 B2
(45) Date of Patent: Oct. 1, 2013

(54) SYSTEMS AND METHODS FOR MINIMIZING EFFECTS OF AUTHORIZED USER CREDIT TRADELINES

(75) Inventor: Ezra D. Becker, Skokie, IL (US)

(73) Assignee: Trans Union LLC., Chicago, IL (US)

(*) Notice: Subject to any disclaimer, the term of this patent is extended or adjusted under 35 U.S.C. 154(b) by 988 days.

(21) Appl. No.: 12/257,220

(22) Filed: Oct. 23, 2008

(65) Prior Publication Data
US 2009/0106141 A1 Apr. 23, 2009

Related U.S. Application Data

(60) Provisional application No. 60/982,033, filed on Oct. 23, 2007.

(51) Int. Cl.
G06Q 40/02 (2012.01)
(52) U.S. Cl.
USPC .............................................. 705/38; 705/35

(58) Field of Classification Search
USPC ...................................................... 705/35, 38
See application file for complete search history.

(56) References Cited

U.S. PATENT DOCUMENTS
2006/0155639 A1* 7/2006 Lynch et al. .................... 705/38

* cited by examiner

Primary Examiner — Elda Milef
(74) Attorney, Agent, or Firm — William J. Lenz; Neal, Gerber & Eisenberg LLP

(57) ABSTRACT

Systems and methods for identifying, evaluating, and accounting for effects of authorized user trade lines are disclosed. The systems and methods incorporate use of credit characteristics that describe the nature of authorized user trade lines on a credit file or across credit files, and the influence of those authorized user relationships relative to the non-authorized user trade lines on the credit file in the evaluation of credit risk. Systems and methods incorporating these credit characteristics can be used in identifying any bias in perceived credit risk, in the evaluation of credit risk, or other credit-related evaluation.

21 Claims, 3 Drawing Sheets

SYSTEMS AND METHODS FOR MINIMIZING EFFECTS OF AUTHORIZED USER CREDIT TRADELINES

CROSS-REFERENCE TO RELATED APPLICATION

This application claims priority from U.S. Provisional Patent Application Ser. No. 60/982,033 filed Oct. 23, 2007, which is incorporated herein by reference.

TECHNICAL FIELD

The present invention relates to consumer credit risk management, and more particularly to systems and methods for minimizing the distortion of the perceived credit risk of a consumer due to the presence of authorized user trade lines (i.e., credit accounts or other items on a credit report) on the consumer's credit file.

BACKGROUND OF THE INVENTION

The consumer lending industry bases its decisions to grant credit or make loans, or to give consumers preferred credit or loan terms, on the general principle of risk, i.e., risk of foreclosure. Essentially, credit and lending institutions typically avoid granting credit or loans to high risk consumers, or grant credit or lending to such consumers at higher interest rates or other terms less favorable than those typically granted to consumers with low risk. As a means to label risk and allow for relative comparison between individual consumers, lenders use a consumer's credit score. A consumer's credit score is determined, in part, through analysis of the various accounts the consumer is responsible for or has access to. These various accounts are referred to as trade lines and show up as independent line items on the consumer's credit report. Credit scores are well-known industry measures of credit risk, such as the VantageScore$^{SM}$ credit score or the FICO credit score, and are typically based on proprietary algorithms and statistical analyses of consumer data that result in a scoring number within a given range, such as, for example, 501-990. This number correlates to a probability of negative performance, and acts as a predictor of credit risk. The higher the credit score, the less risk posed, and vice-versa.

In conjunction with credit scores, most credit and lending institutions also employ other underwriting criteria to evaluate the credit risk presented by credit and loan applicants, and approve or reject those applicants based on that evaluation. If the applicant is approved, the lender will offer a pricing structure that reflects the risk presented by that customer, so that an appropriate risk-return dynamic is maintained.

Because of the importance placed on credit scores and underwriting criteria with respect to consumer lending and credit, many high risk consumers are motivated to try and increase their credit scores or otherwise improve their credit risk profiles in order to be perceived as less risky by credit and lending institutions, and consequently achieve more favorable consumer lending treatment. This motivation has given birth to an industry of brokers who "rent" trade lines of low risk consumers to high risk consumers by adding the high risk consumers as authorized users to one or more of the low risk consumer's trade lines in exchange for a "rental" fee. In operation, the broker approaches a low risk consumer and offers her a percentage of his fee for the use of her trade lines. The broker then sells access to the trade lines to a high risk consumer. However, in theory, there is no actual usage of the trade lines by the high risk consumer because the high risk consumer does not know the account numbers, or even the identity of the low risk consumer. The low risk consumer simply adds the high risk consumer's name as an authorized user to her trade lines and the trade lines appear on the high risk consumer's credit report. The low risk consumer essentially acts as a "landlord" for the trade line. As an authorized user of a low risk trade line, the high risk consumer is benefited by the good credit behavior of the "landlord" as the risk associated with his or her credit appears lower, e.g. his or her credit score increases. While this practice is legal, it is deceptive in that it misrepresents the risk associated with the high risk consumer's credit.

Under the 1974 revision of the Equal Credit Opportunity Act, the relationship individual consumers have to a given trade line is classified into one of several defined categories. These categories are well known within the lending and credit industries. One such category is "authorized user." The Act defines an authorized user as an individual who may use a trade line but has no financial responsibility for any resulting balance owed. Though there are many other categories (i.e. individual, contractually liable, participating, etc.), they generally all cause an individual to incur a financial responsibility to pay off debt associated with the trade line. Thus, the authorized user category is unique in this sense. For purposes of convenience, all categories other than "authorized user" will herein be classified as "non-authorized user" or "base user." Accordingly, a "non-authorized user trade line" is herein a trade line for which the consumer is a base user and is at least partially financially responsible for debts incurred.

Based on the foregoing effects, a perceived credit risk is defined, which can potentially be very different from an actual credit risk for the same subject consumer. FIG. 1 graphically illustrates a perceived credit risk in connection with credit approval caused by the presence of authorized user trade line. FIG. 2 graphically illustrates a perceived credit risk in connection with the cost of credit caused by the presence of authorized user trade line.

Before proceeding, it will be helpful to define certain terminology commonly used within the industry in defining the status of specific trade lines, as these terms are often used herein in association with describing certain characteristics used for analysis. Trade lines may be either open or closed. Open trade lines are available to the consumer to use. Closed trade lines are those the consumer no longer has access to for additional credit. Trade lines may also be active or inactive. Though different lending institutions utilize different cutoff points to label a term "active," whether or not a trade line is considered active depends generally on the level of activity on that trade line within a given period of time (i.e. whether there is a balance in the account, the amount of that balance, and how frequently/to what extent the balance is changing based on transactions). Whether a trade line is open or closed is thus a separate concept from whether it is active or inactive. A trade line might be open, but inactive (e.g., an available credit card that is not used and has no balance). Alternatively, a trade line might be closed, but active (e.g., a cancelled credit card with a remaining balance due).

Another important status designator is "terminated." This term only corresponds to authorized user trade lines. When an authorized user is removed from an account, e.g. by the primary account holder, the authorized user is said to be terminated. As a result, the corresponding trade line on the authorized user's credit report will appear as a terminated authorized user trade line. Of particular importance to the problem of "renting" trade lines to authorized users as set forth above is that, regardless of the status of a trade line (e.g., open, inactive, terminated, etc.), it will remain in existence on a consumer's credit report, potentially indefinitely. Accordingly, the trade line's ability to impact a credit score may be permanent but for the tools provided herein.

The present invention addresses these and other problems through the application of systems and methods designed to offer credit and lending institutions tools to effectively identify and address various effects of authorized user trade lines, including intentional abuse of authorized user trade lines to misrepresent credit risk and unintentional effects of authorized user trade lines on credit risk.

SUMMARY OF THE INVENTION

The present invention is generally directed to systems and methods for identifying and evaluating authorized user trade line activity and patterns, such as those associated with authorized user trade line abuse. The systems and methods of the present invention are designed to, among other things: (1) assist lending institutions in identifying both existing customers within their respective portfolios and consumers applying for credit and/or other services that have obtained authorized user status on one or more trade lines belonging to other consumers for the purpose of reducing the customer's perceived credit risk, as evaluated by statistical credit scores and/or by underwriting criteria; (2) assist lending institutions in identifying both existing customers within their respective portfolios and consumers applying for credit and/or other services whose credit scores do not accurately reflect their true credit risk due to the presence of authorized user trade lines, regardless of intent to misrepresent the credit risk; (3) assist lending institutions in identifying existing customers within their respective portfolios that have designated other consumers as authorized users on one or more trade lines on the customer's/consumer's report for the purpose of inflating the authorized user's credit score, i.e. "landlords"; (4) assist lending institutions in evaluating both qualitatively and quantitatively the risks inherent in the aforementioned activities; and (5) allow credit reporting companies to perform analyses to identify and evaluate, both qualitatively and quantitatively, the risk impact of existing customers and applicants for credit and/or other services from a financial institution who participate in the activities described above.

In a particular embodiment, methods of identifying, evaluating, and accounting for effects of authorized user trade lines is accomplished by (1) development of summary statistics (also known as credit characteristics) describing the nature of authorized user trade lines on a credit file or across credit files, and the influence of those authorized user relationships relative to the non-authorized user trade lines on the credit file in the evaluation of credit risk; and (2) use of such credit characteristics in identifying any bias in perceived credit risk, or in the evaluation of credit risk. Data based on one or more of these characteristics can be incorporated into: debt portfolio reviews; online credit file alerts; batch or online prescreen processes for the purpose of offering credit or loans, or making a credit or loan approval decision; the development of statistical credit scoring models; segmentation methodologies to classify consumers according to perceived credit risk; application underwriting criteria or portfolio management decision and treatment strategies; collections strategies; analyses aimed at comparing the effectiveness of credit scores and/or underwriting criteria in the evaluation of credit risk.

Other aspects will become apparent and be more fully understood from the following detailed description and accompanying drawings, which set forth illustrative embodiments that are indicative of the various ways in which the principals of the invention may be employed.

DETAILED DESCRIPTION OF THE PREFERRED EMBODIMENTS

Figure 1:
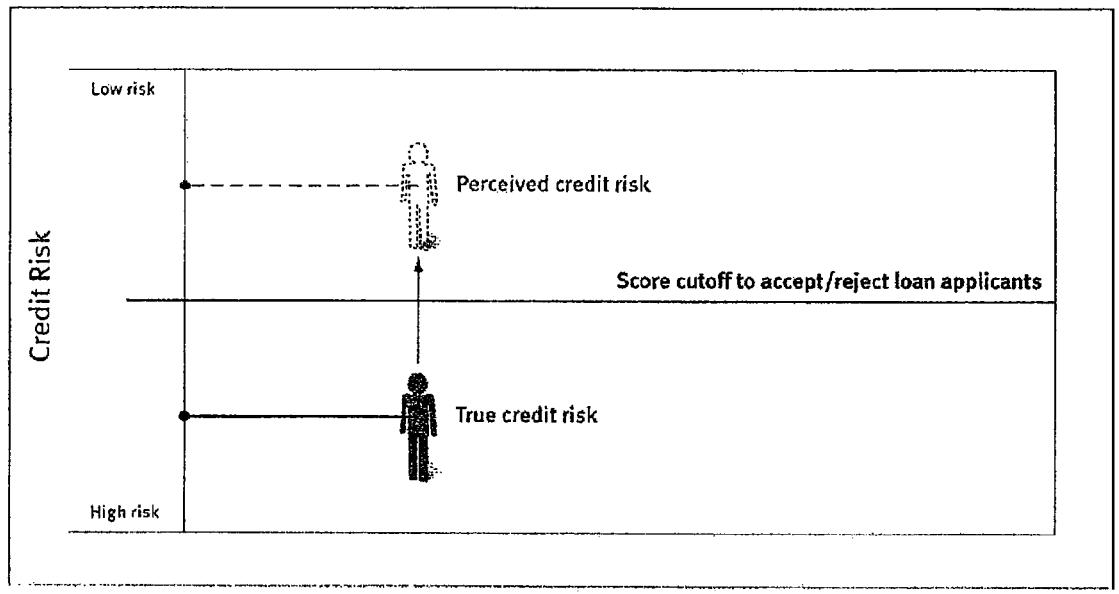
FIG. 1 is a chart that graphically illustrates a perceived credit risk in connection with credit approval caused by the presence of authorized user trade lines.
Figure 2:
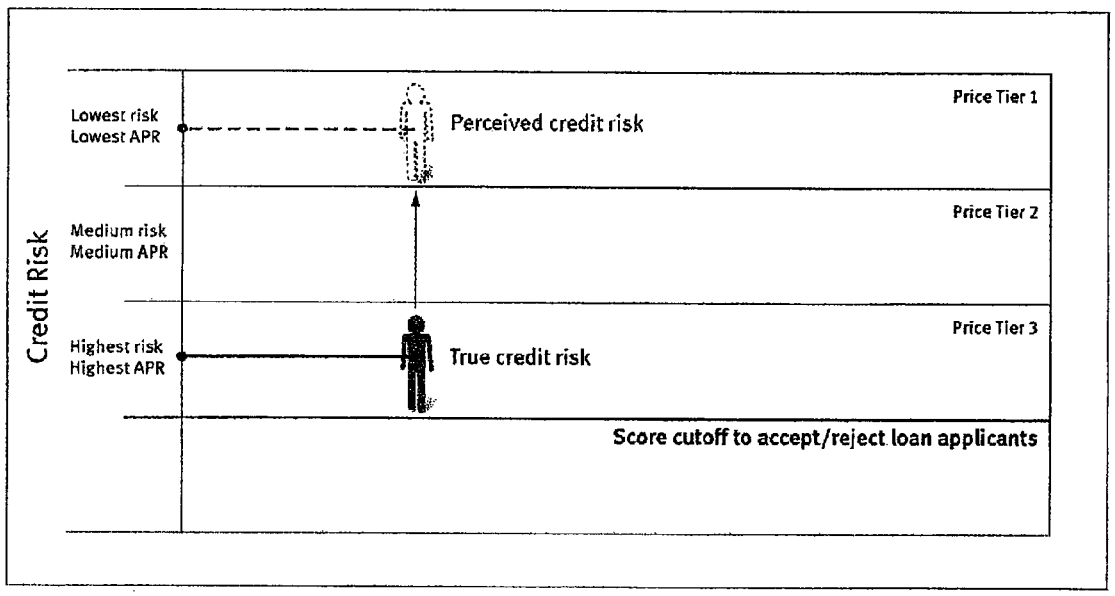
FIG. 2 is a chart that graphically illustrates a perceived credit risk in connection with the price of credit caused by the presence of authorized user trade lines.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers in cases where such labeling facilitates a more clear description. Additionally, the drawings set forth herein are not necessarily drawn to scale, and in some instances proportions may have been exaggerated to more clearly depict certain features.

In accordance with the principles of the present invention, one or more algorithms or analyses may be applied, alone or in combination, to a set of data to produce a tangible and useful result indicative of authorized-user-related issues. In a particular embodiment, characteristics are defined and determined for a specific set of data, resulting in useful statistics indicative of authorized-user-related issues. Data for specific files may be processed in light of these characteristics and an output specific to those files and related to those characteristics can be generated for use and analysis, which will be described in more detail below.

Figure 3:
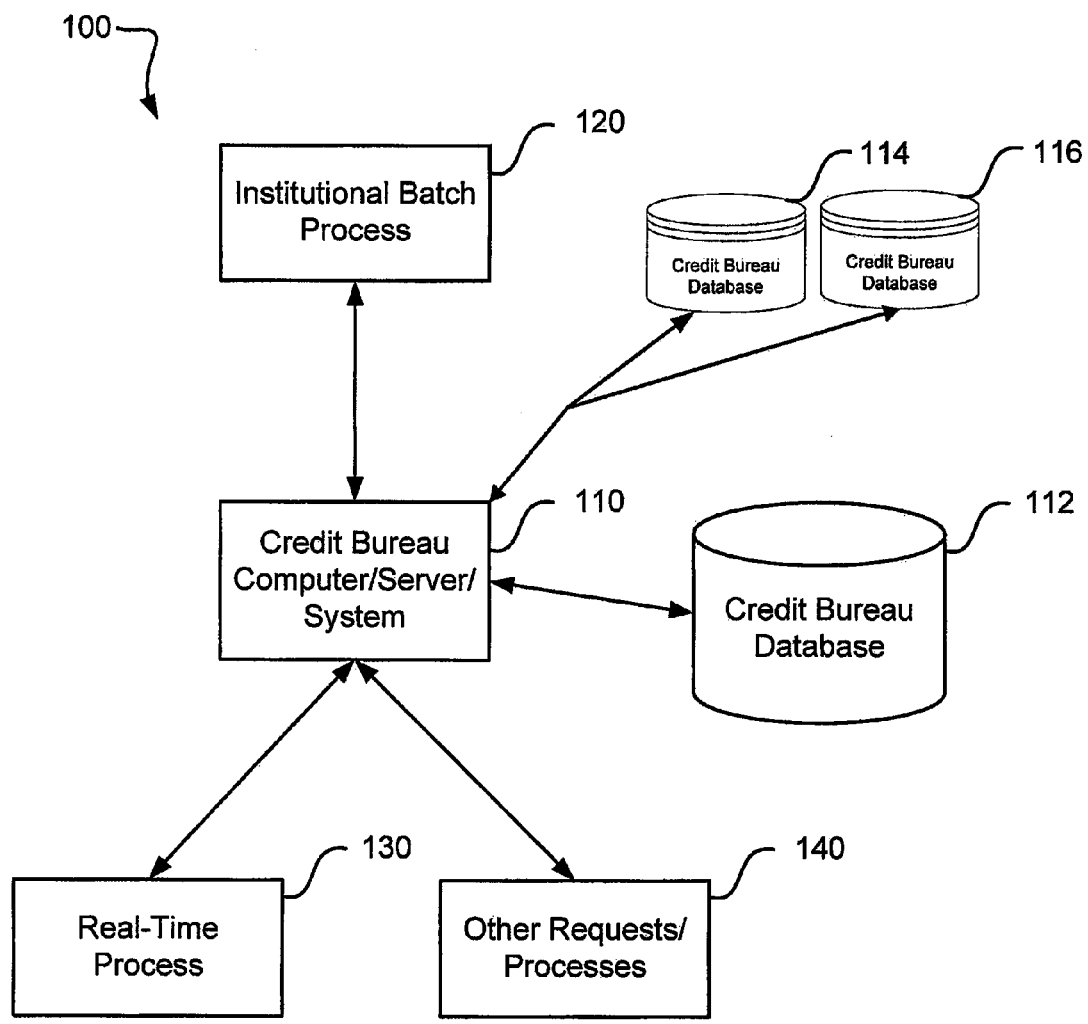
FIG. 3 is a block diagram illustrating a system in accordance with the principles of the present invention.

Referring to FIG. 3, the processes contemplated by the present invention are preferably implemented in a system 100, which includes a computer server 110 and a database 112. Preferably, the computer server 110 and the database 112 are associated with a particular credit reporting company. In an alternate embodiment, the computer server 110 is also capable of communicating with one or more other databases 114, 116, which may be associated with additional credit reporting companies. As illustrated in FIG. 3, data may be processed in connection with a batch process 120, where, for example, a lending institution may desire to have its database of existing consumer files processed and updated to reflect an analysis based on the statistics/characteristics contemplated herein. Other processes may include a real-time process 130, which may, for example, be associated with processing of a credit applicant's application in real time to determine whether that applicant may qualify for credit based on criteria set with respect to the statistics/characteristics contemplated herein. Other requests or processes 140 can also access the server 110.

Figure 4:
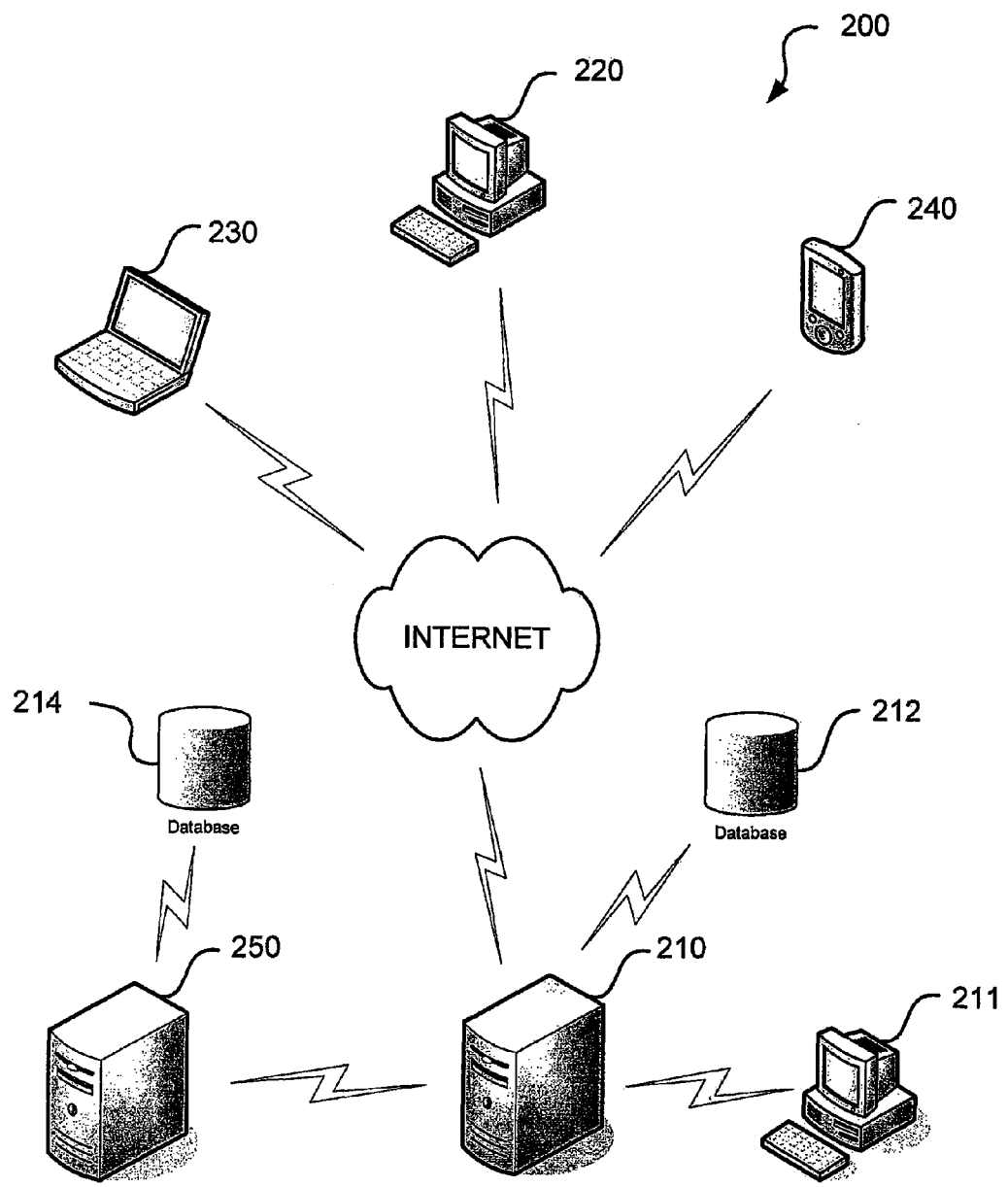
FIG. 4 is a diagram illustrating embodiments of component arrangements for implementing a system in accordance with the principles of the present invention.

In a preferred implementation, a system 200 is provided, such as that shown in FIG. 4. In the system 200, the Internet provides a portal or gateway for communication with a server 210 to effectuate the statistic/characteristic processes. The server may include one or more other computers 211, such as those associated with a network in communication with the server 210. In a preferred embodiment, the server 210 is in communication with credit database 212. The server 210 may also be in communication with one or more other servers 250, which may in turn be in communication with other credit databases 214. The processes contemplated by the present invention may be interfaced through the Internet via any type of device capable of Internet communication, such as, for example, a laptop computer 230, a desktop computer or workstation 220, a handheld computing device 240, or the like.

The processes and underlying characteristics contemplated by the present invention will now be described in more detail.

Credit File Summary Statistics Related to Authorized User Trade Lines

In one embodiment, the principles of the present invention may be applied through preparation of a set of summary statistics for a credit file for use in reviewing and determining authorized user trade line activity and its potential and actual effects. These summary statistics can be generated for a group of files in an automated batch mode process. Furthermore, the analysis or decision making with respect to the summary statistics for these files can also be implemented in an automated real-time process.

A series of statistics (characteristics) that summarize the nature of authorized user trade lines on a consumer's credit report or across credit reports, as well as similar statistics for non-authorized user trade lines, can be defined and used for the purpose of evaluating the impact on perceived credit risk of the presence of authorized user trade lines on a consumer's credit file. These statistics and their analysis can be automated in a batch mode process for a given group of credit files, thus giving an entity a process for ascertaining or responding to authorized user trade line issues.

Statistics and characteristics that may be relevant to the analyses are related to features of a trade line such as its status, age, balance, utilization and limit. For instance, the status of a trade line suggests whether it is active, inactive, open, terminated, etc. Age of a trade line indicates how long it has been open. Length of time could also be relevant as to how long the trade line has been in its present status. Balance of a trade line indicates the amount of outstanding financial obligation, while limit denotes the maximum authorized amount that may be borrowed or otherwise incurred as debt under the trade line. Utilization combines the characteristics of limit and balance. For instance, a trade line with a limit of $1000 and a balance of $100 has a 10% utilization. Utilization could also be viewed in terms of trade line activity. An inactive trade line would have no utilization and might be indicative of an authorized user trade line with a nefarious purpose. Other characteristics of interest might relate to the type of collateral that defines the underlying account; e.g. whether the account is a home mortgage, a car loan, or a retail purchase money line of credit. These and other features of trade lines, which are all well known and understood within the art, can be analyzed to produce a set of statistics, many of which are useful in determining the affects of authorized user trade lines on credit risk perception.

Examples of such summary statistics that may be used in the process may include, but are not limited to: the number of active authorized user trade lines; the number of terminated authorized user trade lines; the percentage of open, revolving trade lines that have authorized user status; and the ratio of the number of authorized user trade lines with a delinquency status of current to the number of total trade lines. The application of these characteristics may include but are not limited to evaluation of existing customers through a portfolio review process, and the evaluation of consumers as potential applicants for credit through a credit prescreen process. These processes are preferably implemented in a computer environment utilizing a database system.

In an alternate embodiment, a series of statistics that summarize the nature of authorized user trade lines on a consumer's credit report, as well as similar statistics for non-authorized user trade lines and/or for non-active authorized user trade lines, can be implemented in an online environment (e.g., web portal, ASP, secure system access, etc.). Such an implementation may include real-time evaluation of existing customers requesting a credit line increase, and the real-time evaluation of applicants for credit. Examples of such characteristics/statistics include but are not limited to: the number of active authorized user trade lines; the number of terminated authorized user trade lines; the percentage of open, revolving trade lines that have authorized user status; and the ratio of the number of authorized user trade lines with a delinquency status of current to the number of total trade lines.

In a preferred embodiment, the present invention comprises five general solution components: user alerts and methods of providing user alerts; definitions and examples of authorized-user-related data characteristics; methods for analysis of the authorized-user-related data characteristics; reports and methods of reporting authorized-user-related data; and incorporation of authorized-user-related data characteristics into statistical credit scores or underwriting criteria. Each of these five general components, or solution areas, is discussed in more detail below.

User Alerts

The principles of the present invention may be applied through a series of alerts associated with certain characteristics/statistics. In one embodiment, a series of alerts is provided in real time as a component of a consumer's credit file in response to an inquiry on the part of a lending institution for that credit file. This inquiry may be related, for example, to the process of evaluating an application by that consumer for the extension of credit. Examples of characteristics/statistics for use in connection with alerts include the number of active authorized user trade lines on the consumer's credit file, and the percentage of open, revolving trade lines that have authorized user status. The specific cut-off value for triggering each alert may be determined by each individual financial institution that uses this product.

In another embodiment, the principles of the present invention may be applied through a report or series of reports that are provided to financial institutions that report the status of the loans within their respective portfolios to a credit reporting company. These reports can provide a list of the those accounts reported by the financial institution whose corresponding account holders are authorized users on more than a specified number of trade lines, and the identifying and contact information for those account holders. The specific cut-off value for triggering inclusion into each summary report may be determined by each individual financial institution that uses this product. These report processes are preferably implemented in a computer environment utilizing a database system.

In yet another embodiment of the present invention, a credit monitoring agency contacts a client lender when certain activities related to authorized user trade lines affect the risk associated with one of the lender's debt portfolios in a certain manner. Such an alert may also be self-generating, such as on a computer terminal. In another embodiment, the alert is associated with a specific loan. In still another embodiment, a set of user alerts are defined and added to a credit report that provides an alert or notice of various data conditions indicative of predetermined authorized-user-related criteria. These alerts may be used in a variety of ways, such as to identify specific accounts as high risk accounts.

Alerts might be generated based on a variety of factors. For example, a set of triggering criteria can be defined based on certain data analysis results that may be indicative of certain authorized-user-related activity, such as determination of the number of authorized user trade lines within a given consumer's credit report. As an example, the number of active authorized user trade lines may also be determined and compared to the number of terminated authorized user trade lines or to the total number of open trade lines for a particular credit file. In comparing the number of terminated authorized user trade lines to the total number of open trade lines for a particular consumer's credit file, a percentage of open active trade lines with authorized users can be calculated and used as a measure of authorized-user-related activity and hence, potential trade line abuse.

Authorized-User-Related Data Characteristics

In accordance with the principles of the present invention, a set of credit data characteristics can be created or defined that relate to, or are indicative of, certain authorized user activity, which may help in evaluating whether authorized user trade line abuse is suspected for a given credit file. In a particular embodiment, a set of data characteristics or variables have been defined as follows:

Number of authorized user trade lines
Number of currently active and open authorized user trade lines updated in the past 3 months
Number of satisfactory open authorized user trade line
Number of authorized user trade lines opened in past 3 months
Number of authorized user trade lines opened in past 6 months
Number of authorized user trade lines opened in past 12 months
Number of authorized user trade lines opened in past 18 months
Number of authorized user trade lines opened in past 24 months
Number of open authorized user trade lines, verified in the past 6 months
Number of open authorized user trade lines, verified in the past 12 months
Months since oldest authorized user trade opened
Months since most recent authorized user trade opened
Months since second most recent authorized user trade opened
Months since third most recent authorized user trade opened
Number of satisfactory open authorized user trade lines 3 months or older
Number of satisfactory open authorized user trade lines 6 months or older
Number of satisfactory open authorized user trade lines 12 months or older
Total high credit/credit limit of open authorized user trade lines updated in the past 12 months
Number of open authorized user trade lines with balance>0 updated in the past 12 months
Percentage of open authorized user trade lines>50% of limit updated in the past 12 months
Percentage of open authorized user trade lines>75% of limit updated in the past 12 months
Total balance of open authorized user trade lines updated in the past 12 months
Ratio of total balance to high credit/credit limit for open authorized user trade lines updated in the past 12 months
Average balance of open authorized user trade lines updated in the past 12 months
Months since most recent authorized user trade delinquency
Total balance of open authorized user trade lines, excluding mortgage updated in the past 12 months
Number of authorized user trade lines opened in past 2 months
Number of authorized user revolving trade lines
Number of authorized user bankcard trade lines
Number of authorized user bank installment trade lines
Number of authorized user finance installment trade lines
Number of authorized user finance trade lines
Number of authorized user finance revolving trade lines
Number of authorized user installment trade lines
Number of authorized user mortgage trade lines
Number of authorized user retail trade lines
Number of authorized user trade lines ever 30 or more days past due
Number of authorized user trade lines ever 60 or more days past due
Number of authorized user trade lines ever 90 or more days past due
Number of non-authorized user trade lines
Number of currently active and open non-authorized user trade lines updated in the past 3 months
Number of satisfactory open non-authorized user trade lines
Number of non-authorized user trade lines opened in past 3 months
Number of non-authorized user trade lines opened in past 6 months
Number of non-authorized user trade lines opened in past 12 months
Number of non-authorized user trade lines opened in past 18 months
Number of non-authorized user trade lines opened in past 24 months
Number of open non-authorized user trade lines, verified in the past 6 months
Number of open non-authorized user trade lines, verified in the past 12 months
Months since oldest non-authorized user trade opened
Months since most recent non-authorized user trade opened
Months since second most recent non-authorized user trade opened
Months since third most recent non-authorized user trade opened Number of satisfactory open non-authorized trade lines 3 months or older Number of satisfactory open non-authorized trade lines 6 months or older Number of satisfactory open non-authorized trade lines 12 months or older Total high credit/credit limit of open non-authorized user trade lines updated in the past 12 months Number of open non-authorized user trade lines with balance>0 updated in the past 12 months Percentage of open non-authorized user trade lines>50% of limit updated in the past 12 months Percentage of open non-authorized user trade lines>75% of limit updated in the past 12 months Total balance of open non-authorized user trade lines updated in the past 12 months Ratio of total balance to high credit/credit limit for open non-authorized user trade lines updated in the past 12 months Average balance of open non-authorized user trade lines updated in the past 12 months Months since most recent delinquency on non-authorized user trade lines Total balance of open non-authorized user trade lines, excluding mortgage updated in the past 12 months Number of non-authorized user trade lines opened in past 2 months Number of non-authorized user revolving trade lines Number of non-authorized user bankcard trade lines Number of non-authorized user bank installment trade lines Number of non-authorized user finance installment trade lines Number of non-authorized user finance trade lines Number of non-authorized user finance revolving trade lines Number of non-authorized user installment trade lines Number of non-authorized user mortgage trade lines Number of non-authorized user retail trade lines Number of non-authorized user trade lines ever 30 or more days past due Number of non-authorized user trade lines ever 60 or more days past due Number of non-authorized trade lines ever 90 or more days past due In a preferred embodiment, the following characteristics are utilized in connection with portfolio review and prescreen processes, particularly in connection with real-time processes for decision making:

Number of active authorized user trade lines

Number of open, active authorized user trade lines, verified in the past 12 months Months since three most recent active authorized user trade lines opened Total high credit/credit limit of open, active authorized user trade lines updated in the past 12 months Percentage of open, active authorized user trade lines with utilization of at least 50% of credit limit updated in the past 12 months Total balance of open, active authorized user trade lines updated in the past 12 months Ratio of total balance to high credit/credit limit for open, active authorized user trade lines updated in the past 12 months Age of file—age of oldest active authorized user trade line Ratio (percentage) of active authorized user bankcard trade lines to total number of bankcard trade lines Ratio (percentage) of active authorized user revolving trade lines to total number of revolving trade lines Ratio of active authorized user credit limit to total credit limit Ratio (percentage) of active authorized user trade lines 90+ days past due ("DPD") to total number of 90+ DPD trade lines Age of oldest active authorized user trade line to age of oldest non-authorized user trade line Ratio (percentage) of active authorized user trade lines to all trade lines Percentage of satisfactory open revolving trade lines that are active authorized user trade lines Number of satisfactory open non-authorized trade lines 6 months old or older Number of satisfactory open non-authorized trade lines 12 months old or older Months since most recent delinquency on non-authorized user trade lines # of terminated authorized user trade lines # of terminated authorized user trade lines that are 30+ DPD # of terminated authorized user trade lines that are 60+ DPD # of terminated authorized user trade lines that are 90+ DPD

Age of file—age of oldest terminated authorized user trade line

The characteristics listed above describe in part the nature of authorized user trade lines in the context of a single individual's credit file. In another embodiment, characteristics may also be defined that describe the nature of authorized user trade lines in a single individual's credit file in consideration of multiple, related credit files of other individuals. Examples of characteristics of this type include but are not limited to:

The number of other distinct authorized users associated with the authorized user trade lines on a consumer's credit file The number of distinct principal account holders associated with the authorized user trade lines on a consumer's credit file The number of authorized user trade lines that have first appeared on a consumer's credit file within the past three months The number of authorized user trade lines on a consumer's credit file that have had a status change from active to terminated within the past six months The number of authorized users added to a trade line within the past 3 months The number of authorized user trade lines that have had the relationship terminated within the last three months In a preferred embodiment, the following characteristics are defined from information across numerous credit reports and are utilized to evaluate the impact on perceived credit risk of authorized user trade lines. Examples of variables of this type include:

Number of active authorized user trade lines that have appeared on a credit report in the last 3, 6, 12, or 18 months. These characteristics identify if the consumer just added authorized user trade lines to their file, i.e., when the date a trade first appeared on the consumer's file.

For a credit file with active authorized user trade lines, the total number of distinct base account holders for which the given consumer is an authorized user. For example, if there are 4 authorized user trade lines, this will identify whether the base account holders are the same or different people. This will also identify how many different base account holders (or different states) there are for the authorized user trade lines.

For a credit file with active authorized user trade lines, the total number of other authorized users that are also associated with those base accounts for which the given consumer is an authorized user. This will determine how many authorized users are assigned to a base account. This characteristic may also be used for identifying landlords, i.e., consumers who are renting out their low-risk trade lines for the purpose of financial gain.

For a credit file with active authorized user trade lines, the maximum number of other authorized users that are also associated with any single base account for which the given consumer is an authorized user. For example, a file with 2 authorized user trade lines, where for one of them, the base account holder has a total of 10 authorized users on the account. For the other, the base account holder has 3 authorized users on the account. In this case, this characteristic would be equal to 10.

The percentage of active revolving trade lines first appearing on a credit file in the last 3, 6, 9, 12, 18 months that are authorized user trade lines. This will identify if the account holder just added authorized user trade lines to their file, i.e., when the date a trade line first appeared on the consumer's file.

These five characteristics can also be calculated for terminated authorized user trade lines. It is important to note that any of the characteristics defined herein can incorporate relational data across consumer credit files for the purpose of evaluating the impact of authorized user trade lines on perceived credit risk.

Methods for Analysis of the Authorized-User-Related Data Characteristics

In accordance with the principles of the present invention, methods of analysis of authorized-user-related data characteristics are contemplated. Such methods allow credit reporting companies to perform analyses to identify and evaluate, both qualitatively and quantitatively, the risk impact of existing customers and applicants for credit and/or other financial services who participate in authorized user trade line abuse.

In a particular embodiment, a batch pre-screen method is defined, wherein a set of data files is "pre-screened" to identify a subset of consumers meeting predetermined criteria with respect to one or more of the characteristics, and to whom a firm offer of credit will be extended. For example, a set of data files may be pre-screened to determine a subset of consumer files wherein each file has less than five authorized user trade lines.

In yet another embodiment, an online screening method is defined, wherein a consumer credit file is evaluated at the point of application for credit to identify whether that consumer meets the criteria that qualify him or her for an extension of credit, and under what pricing structure. For example, an applicant with no delinquent accounts and less than six authorized user trade lines may be automatically approved for credit, while an applicant with no delinquent accounts and more than five authorized user trade lines will be referred to a manual file review for a final determination as to whether to grant credit or not. Such an embodiment can be implemented in a number of ways, including, but not limited to, web portal access to a database process at a credit reporting company, and ASP process with access or in communication with a credit reporting company database or process, or the like.

In yet another embodiment, a method of data or portfolio review in light of a set of authorized-user-related data variables is defined, wherein a financial institution may send a set of data to a credit reporting company providing portfolio review services for variable data. Once the portfolio review is complete, variable data can be reported back to the financial institution along with the original data, and the variable data can then be analyzed by the financial institution. In an alternate embodiment, the analysis can be conducted by the credit reporting company and the results of the analysis can be communicated to the financial institution.

In yet another embodiment, a method of developing consumer credit risk estimation and evaluation tools that incorporate a set of authorized-user-related data variables is defined, wherein a financial institution may build a statistical scoring model or set of underwriting criteria for use in evaluating consumer credit risk that incorporate authorized-user-related data variables. In an alternate embodiment, the model or underwriting criteria development can be conducted by the credit reporting company and the results of the analysis can be communicated to the financial institution.

Reports and Methods of Reporting Authorized-User-Related Data

In accordance with the principles of the present invention, reports and methods of reporting are defined to assist financial institutions in identifying certain activity relating to authorized user trade lines within that particular financial institution's customer base, such as the existence of "landlords" who "rent" trade lines to high risk consumers.

In a particular embodiment, a report or series of reports are defined and provided to financial institutions that report the status of the loans on their respective portfolios to a credit reporting company. These reports will provide a list of the those accounts reported by the financial institution that possess greater than a specified number of authorized users, and the identifying and contact information for those consumers and/or the principal account holder. The specific cut-off value for triggering inclusion into each summary report shall be determined by each individual financial institution that uses this product.

While one or more specific embodiments have been illustrated and described in connection with the present invention, it is understood that the present invention should not be limited to any single embodiment, but rather construed in breadth and scope in accordance with recitation of the appended claims.

I claim:

1. A method for evaluating the credit risk of an individual or entity associated with a plurality of trade lines, the method comprising the steps of:

identifying using a first computer process executing on a computer processor each of the plurality of trade lines for which the individual or entity is an authorized user;

combining using a second computer process executing on a computer processor at least one characteristic of all said authorized user trade lines to produce an authorized user trade line total;

combining using a third computer process executing on a computer processor the at least one characteristic of all of the plurality of trade lines for which the individual or entity is a base user to produce a base user trade line total;

calculating using a forth computer process executing on a computer processor a ratio between the authorized user trade line total and the base user trade line total, wherein the ratio is indicative of a likelihood that the individual or entity is attempting to misrepresent the risk associated with their credit; and generating using a fifth computer process executing on a computer processor an alert should the ratio exceed a user-defined amount.

2. The method of claim 1 wherein the at least one characteristic comprises age of the trade line.

3. The method of claim 1 wherein the at least one characteristic comprises balance of the trade line.

4. The method of claim 1 wherein the at least one characteristic comprises credit limit of the trade line.

5. The method of claim 1 wherein the individual or entity is a prospective borrower and the method is performed to determine whether to approve a loan.

6. The method of claim 1 wherein the individual or entity is a party responsible for at least a portion of a balance associated with an individual account within a debt portfolio, and the method is performed as a means of review to determine whether to adjust one or more terms of the individual account.

7. The method of claim 1 wherein the at least one characteristic comprises the total number of active trade lines.

8. A method for evaluating risk across a debt portfolio comprised of a plurality of individual accounts, each individual account having at least one account holder responsible for at least a portion of the outstanding debt associated with the individual account, the method comprising the steps of:

filtering using a first computer process executing on a computer processor the debt portfolio to identify high risk accounts, the high risk accounts comprising individual accounts from among the plurality of individual accounts that meet user-defined criteria, at least one of the criteria relating to trade lines of the at least one account holder for which the at least one account holder is an authorized user;

analyzing using a second computer process executing on a computer processor at least one characteristic of the trade lines of each at least one account holder responsible for a high risk account to determine a result indicative of a likelihood that the at least one account holder is using authorized user trade lines to misrepresent the risk associated with their credit; and assigning using a third computer process executing on a computer processor a relative risk to the debt portfolio based on comparing total debt in the debt portfolio to total debt associated with those high risk accounts wherein the result yielded by the analyzing step met a user-defined criteria.

9. The method of claim 8 wherein said debt portfolio is comprised of credit card accounts.

10. The method of claim 9 further comprising the step of preventing using a fourth computer process executing on a computer processor the individual account from receiving a credit limit increase when the analysis of that individual account yields a result that meets a user-defined criteria.

11. The method of claim 8 wherein at least one of the individual accounts within the debt portfolio is a loan having at least one debt convention, the at least one debt convention prohibiting the at least one account holder from maintaining more than a certain quantity of authorized user trade lines.

12. The method of claim 11 further comprising the step of generating using a fourth computer process executing on a computer processor an alert if said number exceeds said certain quantity.

13. The method of claim 8 further comprising the steps of:
repeating the filtering, analyzing and assigning steps over time; and
providing using a fourth computer process executing on a computer processor an alert should the said relative risk exceed a user-defined value.

14. The method of claim 8 wherein the at least one characteristic comprises balance of the trade line.

15. The method of claim 8 wherein the at least one characteristic comprises credit limit of the trade line.

16. The method of claim 8 wherein the at least one characteristic comprises the number of active trade lines.

17. The method of claim 8 wherein the at least one characteristic comprises status of the trade line.

18. A method for identifying and evaluating effects of authorized user trade lines on credit scoring, the method comprising the steps of:

obtaining using a first computer process executing on a computer processor data related to credit of an individual;

processing the data using a second computer process executing on a computer processor based on predefined characteristics having a correlation to effects of authorized user trade lines on credit scoring;

outputting statistics using a third computer process executing on a computer processor based on the predefined characteristics;

comparing using a forth computer process executing on a computer processor those statistics to pre-defined limits; and generating a user alert when the pre-defined limits are exceeded.

19. The method of claim 18 further comprising the step of using the output statistics by computer processor to make at least one business decision.

20. A system for processing data to determine authorized user trade line effects on credit scoring, the system comprising:

a server;

at least one credit database in communication with the server; and a client device in communication with the server, the client device capable of sending data associated with a consumer, and the server capable of facilitating processing of the data against the credit database based on pre-defined characteristics having a correlation to effects of authorized user trade lines on credit scoring; the client device further capable of receiving the processed data from the server as an output indicative of the effect of authorize user trade lines on credit scoring of a consumer.

21. The system of claim 20 wherein the processed data from the server comprises a client alert.

* * * * *